US009585218B2

(12) United States Patent
Pope et al.

(10) Patent No.: US 9,585,218 B2
(45) Date of Patent: Feb. 28, 2017

(54) LIGHTING APPARATUS WITH VARIABLE CURRENT SWITCHING FREQUENCY AND METHODS OF OPERATING SAME

(71) Applicant: Cree, Inc., Durham, NC (US)

(72) Inventors: Daniel Pope, Morrisville, NC (US); Xiuge Yang, Morrisville, NC (US)

(73) Assignee: Cree, Inc., Durham, NC (US)

( * ) Notice: Subject to any disclaimer, the term of this patent is extended or adjusted under 35 U.S.C. 154(b) by 212 days.

(21) Appl. No.: 14/465,431

(22) Filed: Aug. 21, 2014

(65) Prior Publication Data

US 2016/0057823 A1 Feb. 25, 2016

(51) Int. Cl.
*H05B 33/08* (2006.01)
*H05B 37/02* (2006.01)

(52) U.S. Cl.
CPC ..... *H05B 33/0845* (2013.01); *H05B 33/0818* (2013.01); *H05B 37/0281* (2013.01); *Y02B 20/347* (2013.01)

(58) Field of Classification Search
CPC .... H05B 37/02; H05B 37/0281; H05B 33/08; H05B 33/0815; H05B 33/0833; H05B 33/0845
USPC ............. 315/209 R, 224–226, 291, 307, 308
See application file for complete search history.

(56) References Cited

U.S. PATENT DOCUMENTS 8,339,068 B2 * 12/2012 Simmers ............ H05B 33/0815 315/158
2014/0111110 A1 * 4/2014 Qi ...................... H05B 33/0845 315/210
2014/0125248 A1 5/2014 Hu

OTHER PUBLICATIONS

Semiconductor Components Industries, LLC, NCL30105, *Constant Off Time PWM Current-Mode Controller for LED Applications*, retrieved from http://www.onsemi.com/pub_link/Collateral/NCL30105-D.PDF, May 2012; pp. 1-22.

* cited by examiner

*Primary Examiner* — Jimmy Vu
(74) *Attorney, Agent, or Firm* — Myers Bigel, P.A.

(57) ABSTRACT

An apparatus includes a current modulation circuit configured to modulate a current in at least one light-emitting device responsive to a pulse width modulated control signal and a control circuit configured to control a pulse width of the pulse width modulated control signal responsive to a first control input and to control a frequency of the pulse width modulated control signal responsive to a second control input. The first control input may include, for example, a current control input, and the second control input may include a light intensity control input, such as a dimming input. The control circuit may be configured to increase the frequency responsive to a change in the light intensity control input corresponding to a decrease in light intensity and to decrease the frequency responsive to a change in the light intensity control input corresponding to an increase in light intensity.

23 Claims, 6 Drawing Sheets

400
V+
D1
D2
Dn
410
424
Light Intensity Control Input (e.g., dimming input, occupancy sensor input, color component control input)
VDD
VCC
VCC
L
Q2
Q1
Q4
Q3
422
423
PWM Controller
PWM
Microcontroller
R
$V_{sense}$
420

LIGHTING APPARATUS WITH VARIABLE CURRENT SWITCHING FREQUENCY AND METHODS OF OPERATING SAME

BACKGROUND

The present inventive subject matter relates to lighting apparatus and methods and, more particularly, to solid-state lighting apparatus.

Solid-state lighting arrays are used for a number of lighting applications. A solid-state light-emitting device may include, for example, a packaged light emitting device including one or more light emitting diodes (LEDs). These may include inorganic LEDs, which may include semiconductor layers forming p-n junctions, and/or organic LEDs (OLEDs), which may include organic light emission layers.

Solid-state lighting devices are commonly used in lighting fixtures, including task lighting, recessed light fixtures, ceiling mounted troffers and the like. Solid-state lighting panels are also commonly used as backlights for small liquid crystal display (LCD) screens, such as LCD display screens used in portable electronic devices, and for larger displays, such as LCD television displays.

Solid-state lighting devices may be attractive for retrofit/replacement applications, where devices such as LEDs may offer improved energy efficiency, reduced heat generation, extended life and desired performance characteristics, such as certain color and/or color rendering capabilities. For example, LED bulbs are commonly used to replace incandescent bulbs in down lights and other applications to reduce energy consumption and increase time between replacements. LED-based replacements for fluorescent lamps have also been developed.

An LED driver may use a pulse width modulated current source to control current through a string of LEDs. Current through the string may be controlled by a current loop operating at a relatively high PWM frequency, with a duty cycle of a current switch of the current source being varied to regulate the current through the LED string. Output intensity of the LED string may be further controlled by superimposing a second frequency modulation in response to a light intensity control input, such as a dimming input. In particular, this modulation may periodically turn off the current through the LED string responsive to a dimming input. This second modulation may occur at a much lower frequency than the current loop PWM switching frequency.

SUMMARY

Some embodiments of the inventive subject matter provide an apparatus including a current modulation circuit configured to modulate a current in at least one light-emitting device responsive to a pulse width modulated control signal and a control circuit configured to control a pulse width of the pulse width modulated control signal responsive to a first control input and to control a frequency of the pulse width modulated control signal responsive to a second control input. The first control input may include, for example, a current control input, and the second control input may include a light intensity control input, such as a dimming input. The control circuit may be configured to increase the frequency responsive to a change in the light intensity control input corresponding to a decrease in light intensity and to decrease the frequency responsive to a change in the light intensity control input corresponding to an increase in light intensity.

In further embodiments, the frequency includes a first frequency, and the control circuit may be further configured to concurrently modulate the pulse width modulated signal at a second frequency lower than the first frequency and to control the second frequency responsive to the second control input.

In still further embodiments, the control circuit may be configured to control the pulse width of the pulse width modulated control signal responsive to a measure of the current. The control circuit may be further configured to generate samples of the current at a rate that varies with the frequency and to generate the measure of the current from the generated samples. In some embodiments, the control circuit may include a current sense resistor and a switch that couples and decouples the current sense resistor and the at least one light emitting device. The control circuit may be configured to sample the current by sampling a voltage across the resistor.

Further embodiments of the inventive subject matter provide apparatus including at least one light-emitting device and a current control circuit comprising a current regulator configured to pulse width modulate a current in the at least one light-emitting device at a pulse width modulation frequency that varies responsive to a control input other than an input to the current regulator. The current control circuit may be configured to vary the pulse width modulation frequency responsive to a control input for changing a light output characteristic. The control input may include, for example, a dimming input.

In methods according to some embodiments, a pulse width of a pulse width modulation applied to a current in at least one light-emitting device is controlled responsive to first control input. A frequency of the pulse width modulation is controlled responsive to second control input. The second control input may include a light intensity control input, such as a dimming input. Controlling a frequency of the pulse width modulation responsive to a second control input may include increasing the frequency responsive to a change in the light intensity control input corresponding to a decrease in light intensity and decreasing the frequency responsive to a change in the light intensity control input corresponding to an increase in light intensity. The methods may further include sampling the current at a rate that varies with the frequency, and controlling a pulse width of a pulse width modulation applied to a current in at least one light-emitting device responsive to first control input may include controlling the pulse width responsive to the sampled current. In further embodiments, the methods may include concurrently modulating the current at a first frequency and at a second frequency lower than the first frequency and controlling the first and second frequencies responsive to the second control input.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

Some embodiments of the inventive subject matter arise from a realization that improved performance in a switched LED current controller may be provided by varying PWM switching frequency responsive to a light intensity control input, such as a dimming input. Increasing a PWM current loop switching frequency at low light output levels can improve control of light output. Reducing the switching frequency at higher output levels can improve efficiency by reducing switching losses. According to further aspects, the frequency of dimming or other light intensity modulation can also be varied in a similar manner. At low output levels, fluctuation from such modulation may become apparent to an observer. Increasing the frequency of the modulation at low output levels may increase the frequency of fluctuations of light output so that they may be less perceptible to an observer. Thus, for example, when an LED string is dimmed in response to a dimming control signal, a light fluctuation associated with the dimming modulation may be less noticeable.

Figure 1:
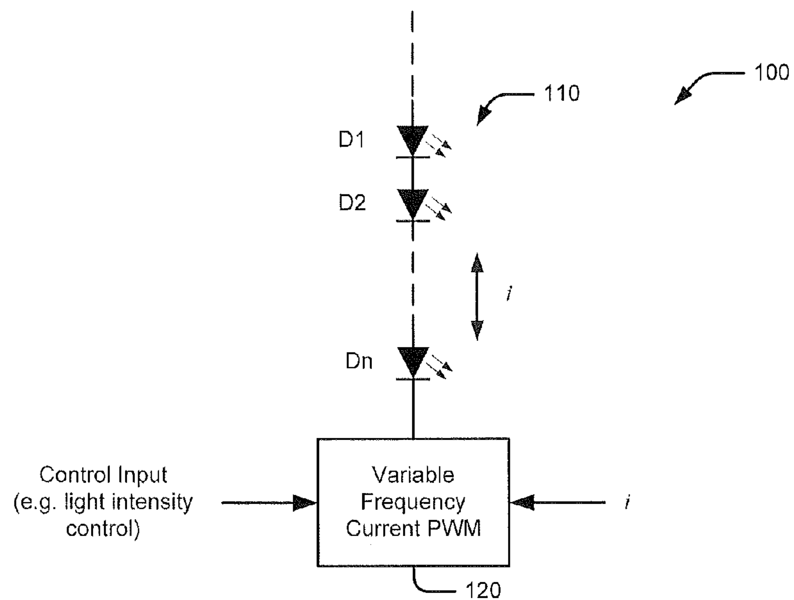
FIG. 1 is a schematic diagram illustrating lighting apparatus according to some embodiments.

FIG. 1 illustrates a lighting apparatus 100 according to some embodiments. The lighting apparatus 100 includes at least one LED coupled to a variable frequency current pulse width modulation circuit 120, which is configured to modulate a current passing through the at least one LED. As shown, the at least one LED includes an LED string 110 including a plurality of LEDs D1, D2, . . . , Dn, but it will be appreciated that other arrangements of one or more LEDs may be used. According to some embodiments, the current pulse width modulation (PWM) circuit 120 may be configured to control the current i through the LED string 110 using a first current modulation having a pulse width that is varied responsive to a measure of the current i (e.g., a measure obtained using a current sensor, such as a current sense resistor, Hall effect sensor or the like). A frequency of this first current modulation may be controlled in response to an additional control input, such as one or more light intensity control inputs. Such light intensity control inputs may include, for example, a dimming input (e.g., phase-cut, 1-10V, 0-10V, or digital dimming control input), a sensor (e.g., occupancy) input and/or a color component control input that is used to control intensity of the LED string 110 in relation to outputs of other LEDs that provide various color components. The one or more control inputs may also control a current reference for the pulse width control, which may be varied, for example, to provide intensity control. According to further embodiments, a second current modulation may be superposed on the first current-feedback based modulation responsive to the light intensity control input and/or one or more other control inputs. A PWM frequency of this second current modulation may also be controlled responsive to the control input, e.g., the light intensity control input.

Figure 2:
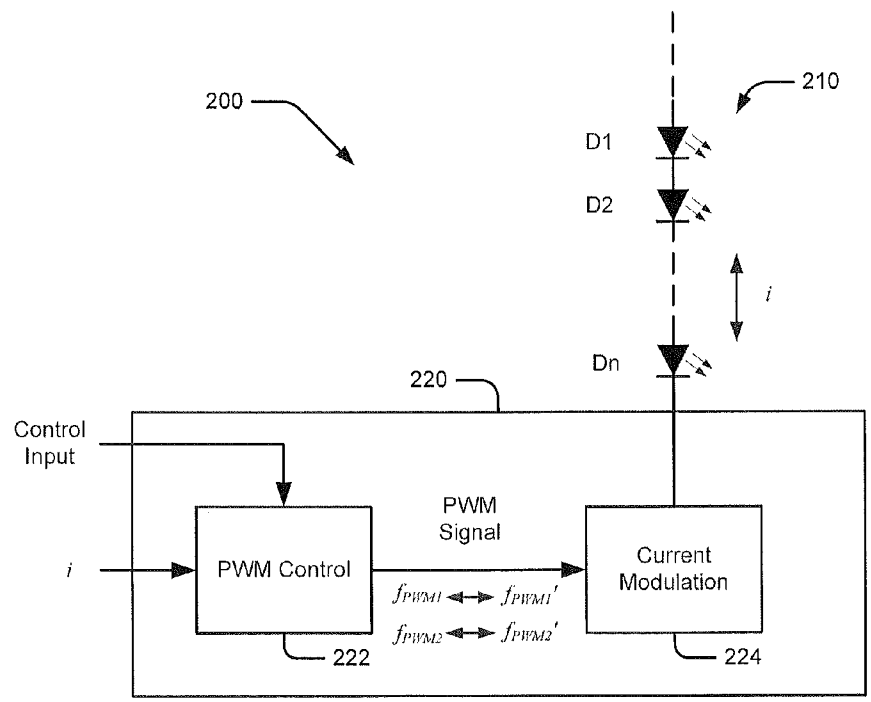
FIG. 2 is a schematic diagram illustrating lighting apparatus with a current control loop and control circuit generating a pulse width modulated control signal according to some embodiments.

According to some embodiments, current modulation as described above may be implemented by controlling a switching type current modulation circuit using a pulse width modulated control signal having modulations corresponding to the current modulations described above. For example, FIG. 2 illustrates a lighting apparatus 200 including a string of LEDs 210 coupled to a current modulation circuit 220, which includes a current modulation circuit 224 coupled in series with the string 210 and a PWM control circuit 222 that controls the current modulation circuit 224. In particular, the PWM control circuit 222 generates a pulse width modulated control signal modulated in a manner corresponding to the current modulation described above, e.g., a pulsed control signal modulated at a first frequency with a pulse width that varies responsive to a measurement of current i through the LED string 210 and modulated at second frequency with a pulse width that varies responsive to another control input, such as a light intensity input. As further shown, the first frequency may vary between first and second values $f_{pwm1}$ and $f_{pwm1}'$ and the second frequency may vary between first and second values $f_{pwm2}$ and $f_{pwm2}'$ responsive to the control input such that, for example, the first and/or second frequencies increase at reduced light intensity levels and decrease at increased light intensity levels. The first and second frequencies may vary independently and/or in different ways. The manner in which the first and second frequencies vary may take various forms, e.g., linear and/or nonlinear.

Figure 3:
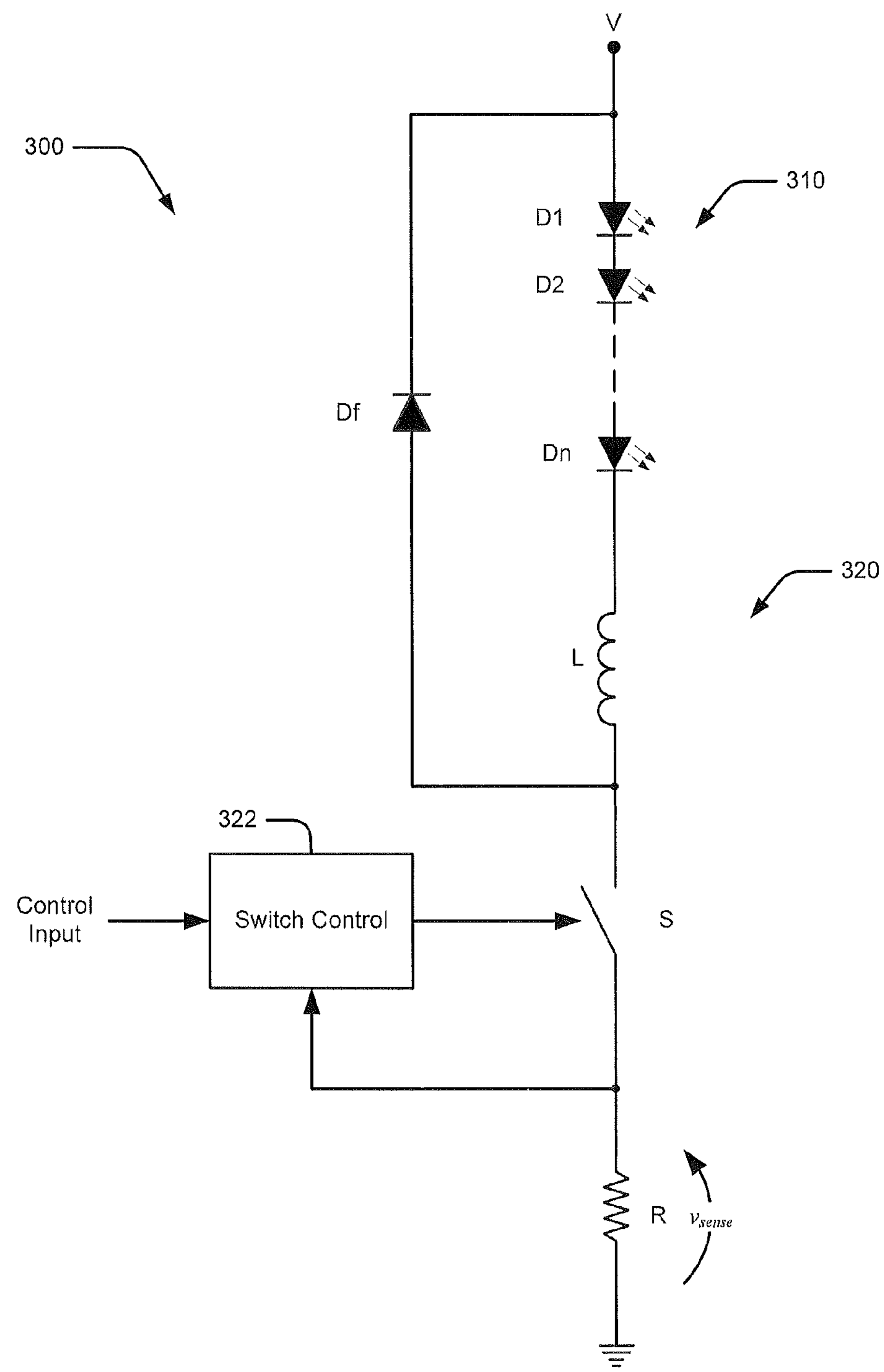
FIG. 3 is a schematic diagram illustrating lighting apparatus with a buck current regulator according to some embodiments.

FIG. 3 illustrates an example of an implementation of the arrangement shown in FIG. 2. A lighting apparatus 300 including an LED string 310 coupled to a buck current regulator circuit 320 including an inductor L and switch S coupled in series with the LED string 310 and a freewheeling diode Df. The switch S is controlled by a switch control circuit 322 responsive to a voltage $v_{sense}$ developed across a current sense resistor R coupled in series with the switch S. In particular, in a current control loop, the switch control circuit 322 may sense (sample) the voltage $v_{sense}$ when the switch S is closed, and may control an "on" time of the switch S responsive to the sensed voltage to provide pulse width modulation of the current through the string 310. A first PWM frequency at which this current control loop operates may be controlled in response to a control input, such as a light intensity control input. The control input may also be used to control a second modulation of the switch S to provide intensity control (e.g., dimming), and a second PWM frequency of this modulation may also vary responsive to the control input.

It will be understood that PWM frequency control along the lines described above may be implemented in a number of different ways. Some embodiments using a configuration such as that illustrated in FIG. 3 may control a duration of a period of the modulation of the switch S responsive to a light intensity control input (e.g., a dimming input), with a duration of the "on" time of the switch S being controlled responsive to a control input (e.g., a current reference signal) provided to a current loop that also receives current feedback from a current sensor (e.g., the voltage across the current sense resistor R). Some embodiments may be viewed as a modification of a "constant off time" pulse width modulation technique. In particular, a conventional circuit having a buck current regulator configuration along the lines of FIG. 3 may use a modulation scheme in which the switch S is turned "off" for a fixed duration, followed by an "on" time having a duration that is controlled by a current control loop controlled by a current reference signal. In some embodiments of the inventive subject matter, pulse width of the "on" time may be controlled in a similar manner, but the switch control circuit 322 may also vary the duration of the "off" time of the switch S responsive to another control input (e.g., a light intensity control input, such as a dimming input), to thereby control the PWM frequency. For example, for higher intensity levels, the duration of the "off" time may be increased and, for lower intensity levels, the duration of the "off" time may be reduced.

Figure 4:
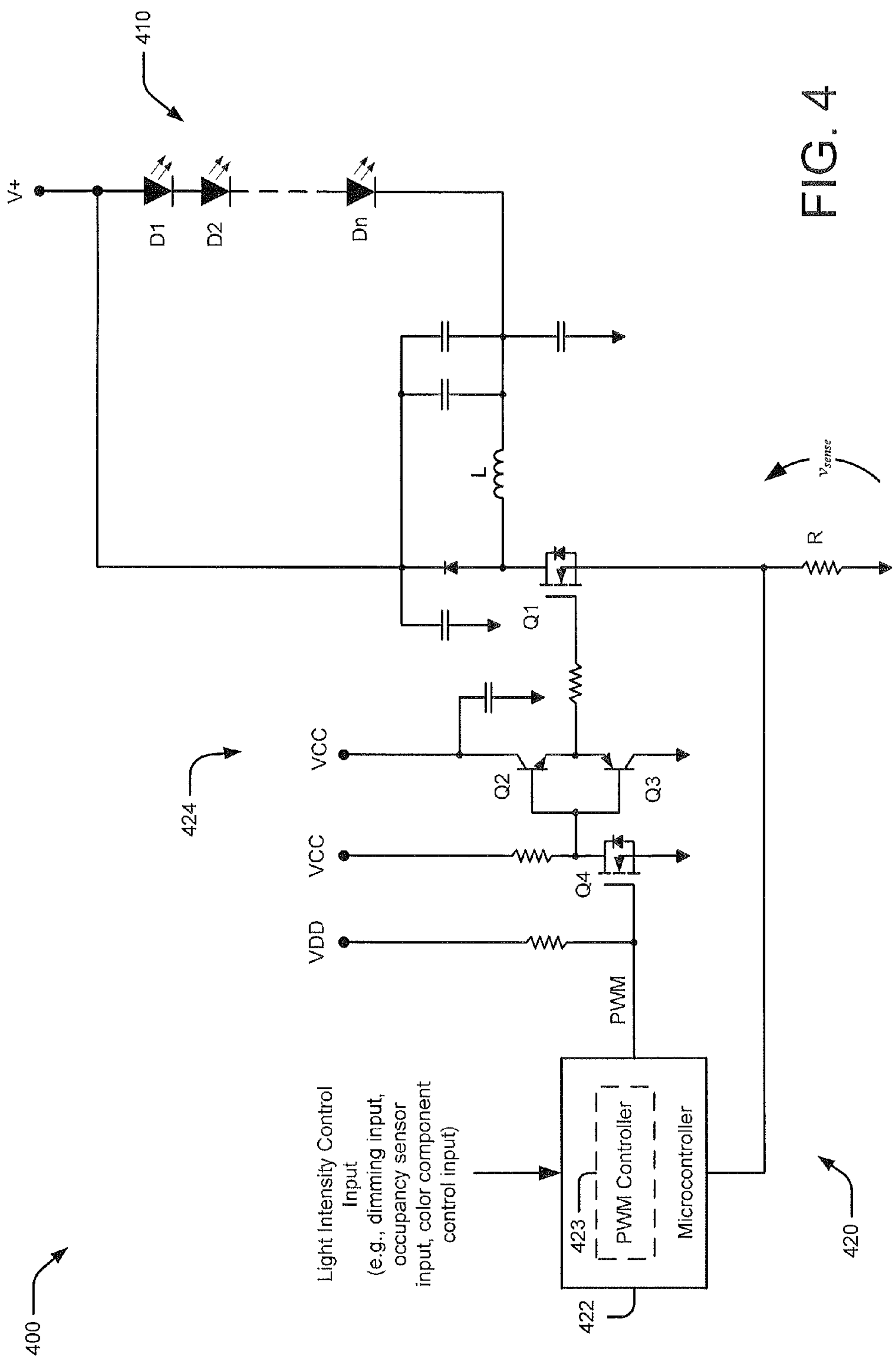
FIG. 4 is a schematic diagram illustrating lighting apparatus including a microcontroller-based current control circuit according to some embodiments.

FIG. 4 illustrates a lighting apparatus 400 including a current control circuit with a PWM controller 423 implemented in a microcontroller 422. The microcontroller 422 may be, for example, a digital signal controller with integrated circuitry for sampling analog signals from sensors and other sources and circuitry for generating PWM waveforms for controlling external devices, such a power switching transistors. Examples of such microcontrollers are the PIC® microcontrollers produced by Microchip Technology Inc., such as the dsPIC33EP32MC202 digital signal controller. It will be appreciated that other types of microcontrollers or other data processing devices may be used in other embodiments.

The microcontroller 422 generates a pulse width modulated control signal PWM that is applied to a current modulation circuit 424 coupled in series with an LED string 410, an inductor L, and a current sense resistor R. The LED string 410 is connected to a power supply that supplies current to the LED string 410 at a voltage V+. The power supply may include, for example, a DC power supply that generates the voltage V+ from an AC power source, such as an AC power distribution system in a building or other facility.

The current modulation circuit 424 includes a current switching transistor Q1 coupled in series with the LED string 410. The current switching transistor Q1 is driven by a driver stage including transistors Q2-Q4, biased to various power supply voltages VDD, VCC.

The microcontroller 422 modulates the pulse width modulated control signal PWM responsive to a voltage $V_{sense}$ across the current sense resistor R and a light intensity control input. The light intensity control input may include, for example, a dimming control input and/or an occupancy sensor input provided to the microcontroller 422 and/or a control input internally generated by the microcontroller 422, such as a color component control input. Along lines described above, the pulse width modulated control signal PWM may be modulated at a first frequency with a duty cycle that varies responsive to the feedback from the current sense resistor R as part of a current control loop. The first frequency may be controlled responsive to the light intensity control input. For example, for lower intensity settings, the first frequency may be increased to improve current regulation and thus reduce light fluctuations at lower intensity levels. The first frequency may be decreased to provide greater efficiency at higher intensity levels. The control signal PWM may also be modulated at a second frequency with a duty cycle that varies responsive to the light intensity control input, and the second frequency can also be varied responsive to the light intensity control input. In some embodiments, the first frequency may vary from about 50 kHz to about 500 kHz, while the second frequency may vary from about 200 Hz to about 3 kHz.

Figure 5:
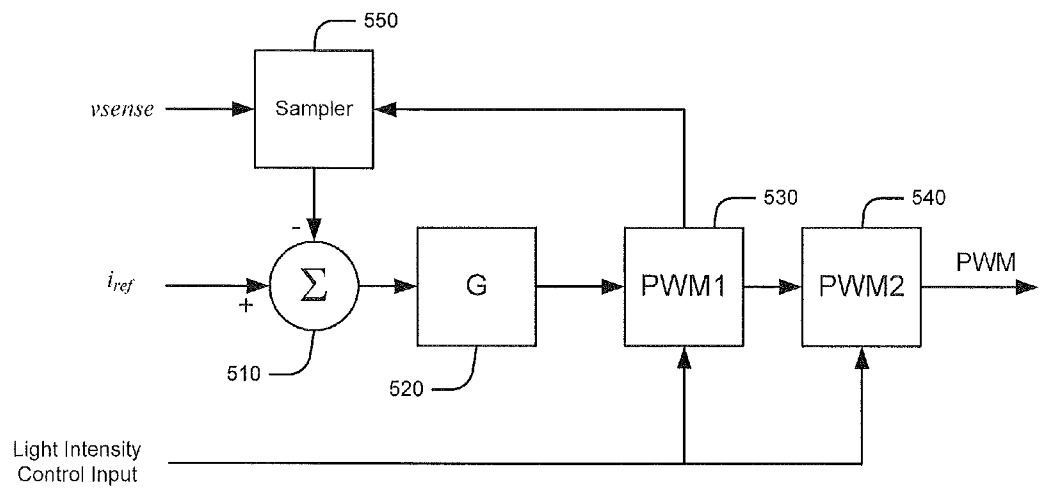
FIG. 5 is a schematic diagram illustrating a control architecture that may be implemented in the microcontroller-based current control circuit of FIG. 4.
Figure 6:
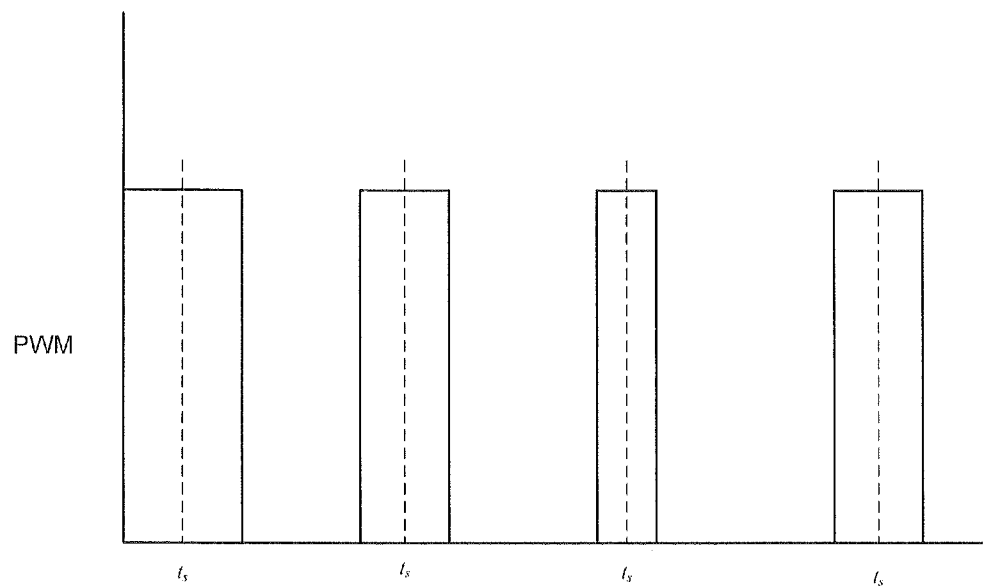
FIG. 6 is a diagram illustrating current sampling operations according to some embodiments.

FIG. 5 illustrates an example of a control architecture that may be implemented using the microcontroller 422. A current reference signal $i_{ref}$ is provided to a summing junction 510, where it is compared to current feedback signal derived from samples of the voltage $v_{sense}$ across the current sense resistor R generated by a sampler 550. As shown in FIG. 6, a voltage sample may be taken at a sample time $t_s$ during "on" intervals of the transistor Q1, e.g., after a delay sufficient to allow transients in the current waveform created by turning on the transistor Q1 to become sufficiently attenuated (sampling in synchronization with the "on" period may be referred to as synchronous sampling). Samples may be averaged or otherwise filtered to generate the current feedback signal $i_{fb}$. For example, in some embodiments, samples taken over a cycle of a dimming modulation (or some other predetermined interval) may be averaged to generate the current feedback signal $i_{fb}$. It will be appreciated that samples may be taken less frequently, e.g., once every nth sample, or more frequently, e.g., m samples per "on" period. In some embodiments, multiple samples may be taken in a given "on" interval and averaged, filtered and/or otherwise processed to generate the current feedback signal $i_{fb}$. In still further embodiments, samples may also be taken during an "off" period of the dimming modulation by momentarily turning the transistor Q1 on and taking a sample of the voltage $v_{sense}$ across the current sense resistor R.

Returning to FIG. 5, an error signal from the summing junction 510 is provided to a compensator 520, which applies a compensation G to generate a control input for a first pulse width modulator 530. The first pulse width modulator 530 generates a first pulse width modulated control signal having a duty cycle that varies responsive to the control input from the compensator 520 and a frequency that varies responsive to a light intensity control input.

As further shown, the first pulse width modulator 520 may also control operation of the sampler 550. For example, as the modulation frequency of the first pulse width modulator 530 varies, the rate at which the sampler 550 samples the current feedback voltage $v_{sense}$ may vary. In some embodiments, the sampling rate may have a relationship to the modulation frequency of the first pulse width modulator 530. For example, the sampler 550 may sample at a rate higher than the modulation frequency, with the sampling gated by the "on" time of the pulse width modulated control signal generated by the first pulse width modulator 530. As the modulation frequency changes, the sampler 550 may increase or decrease its sampling rate to compensate for the changed "on" time, as shown in FIG. 6. The increase and/or decrease may be linearly or proportional and/or nonlinear.

Still referring to FIG. 5, the pulse width modulated signal produced by the first pulse width modulator 530 is provided to a second pulse width modulator 540. The second pulse width modulator applies a second, lower frequency modulation to the pulse width modulated signal produced by the first pulse width modulator 530 to generate the pulse width modulated signal PWM provided to the current modulation circuit 424. The frequency of the modulation applied by the second pulse width modulator 540 may be controlled responsive to the light intensity control input.

Figure 7:
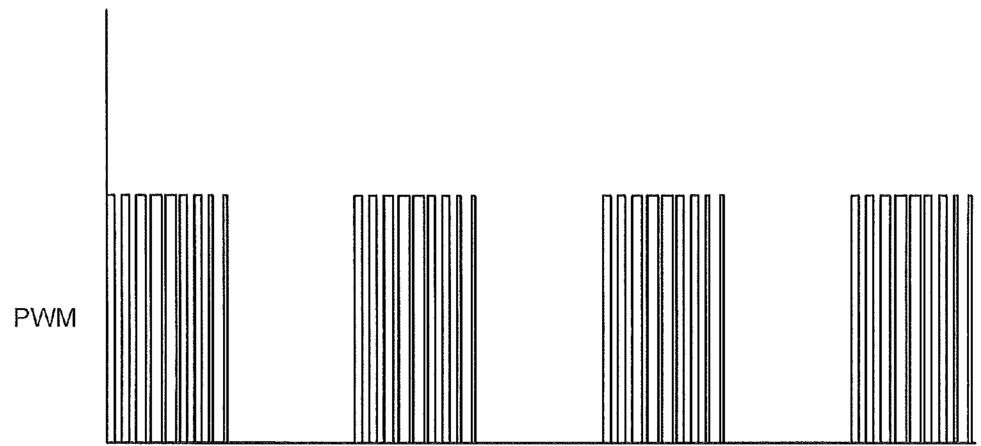
FIGS. 7-11 are waveform diagrams illustrating operations according to some embodiments.
Figure 8:
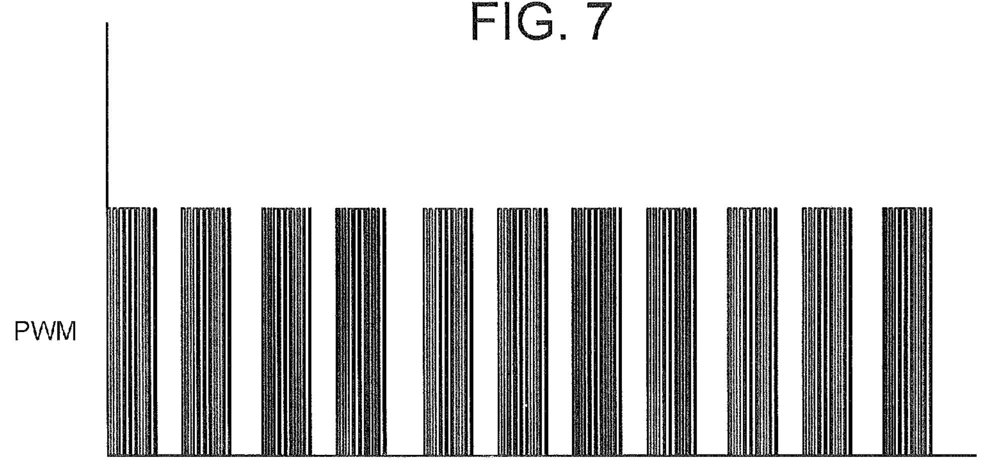
Figure 9:
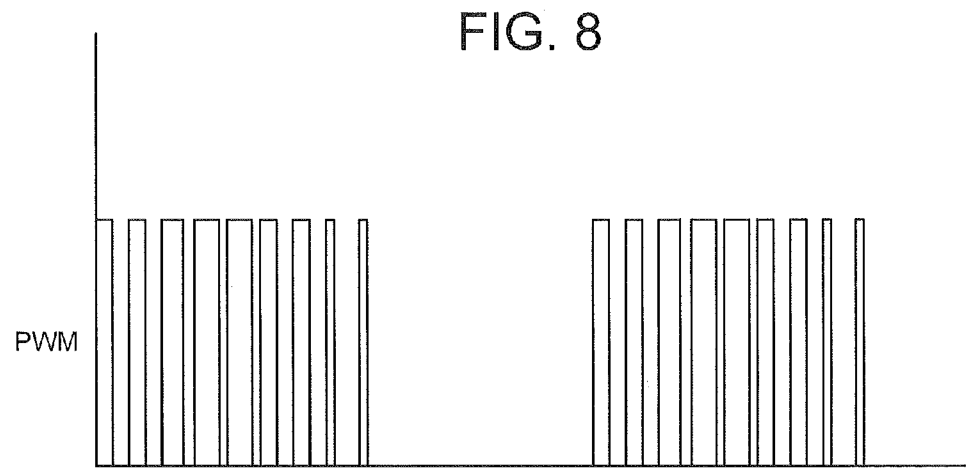

FIGS. 7-9 illustrate examples of waveforms for the control signal PWM. Referring to FIG. 7, at a first intensity control input, the PWM control signal may be modulated at a higher first PWM frequency at a duty cycle that varies responsive to the current sense input from the current sense resistor R. The PWM signal is also modulated at a lower frequency, with a duty cycle that varies responsive to the light intensity control input, resulting in a waveform including spaced apart intervals during which the current loop is active.

As shown in FIG. 8, in response to a light intensity control input corresponding to a reduced intensity, the first and second PWM frequencies are increased. As explained above, this can reduce the likelihood that light fluctuations at the second PWM frequency are noticeable. Moreover, by increasing the sampling rate for the voltage at the current sense resistor R, more accurate control of current through the LED string 410 may be achieved, which can also improve light output quality at low intensity levels. Referring to FIG. 9, when a light intensity control input corresponding to an increased intensity is provided, the first and second PWM frequencies may be reduced. As this reduces the switching of the transistor Q1, efficiency may be improved.

According to further aspects, a tradeoff between the frequency of dimming (or other light intensity) modulation and sampling rate may be made. For example, referring to FIGS. 4 and 5, in the lighting apparatus 400, sampling of the current sense voltage $v_{sense}$ may be proportional to the modulation frequency of the current loop controlling the transistor Q1, e.g., the sampling rate varies proportionally with the switching frequency. The samples generated during a given period of the dimming modulation may be averaged to generate the current feedback signal $i_{fb}$ used as an input to the current loop. Thus, when the PWM frequency of the current loop is increased at lower intensity levels (more dimming), the sampling rate of the sense voltage $v_{sense}$ may increase. In response to the lower intensity, the dimming frequency could also be reduced. Alternatively, the dimming modulation frequency could be maintained at the same level (or reduced a relatively smaller percentage), such that more current samples are generated in a given dimming modulation period. The increased number of samples may enable more accurate current loop performance at low intensity levels by providing more accurate current feedback. As a result, the maximum dimming (lowest intensity) level at which the apparatus may operate may be reduced in comparison to what may be achieved if the dimming modulation frequency is increased.

Figure 10:
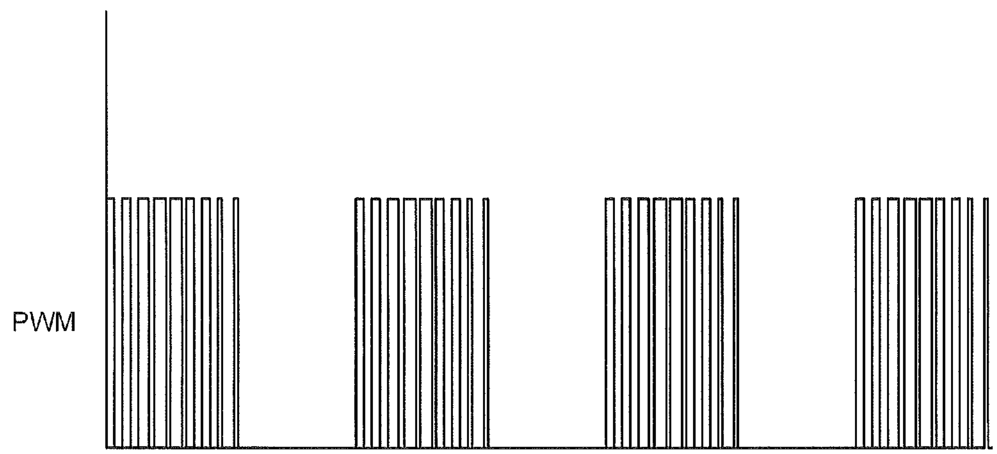
Figure 11:
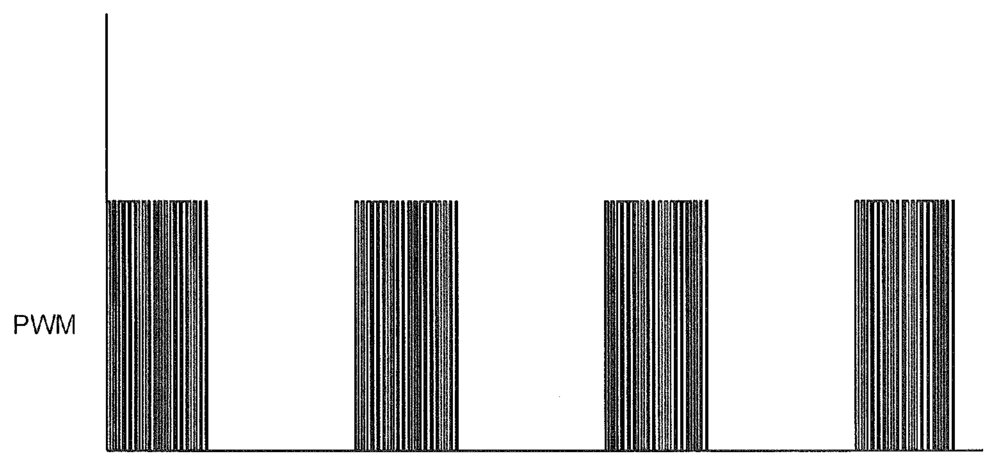

This approach is illustrated in FIGS. 10 and 11, which show a change in dimming modulation frequency (more dimming) leading to an increase in the current loop modulation frequency and a reduction in the dimming modulation duty cycle but no change in dimming modulation frequency. It will be understood that the ability to vary the current loop modulation and dimming modulation frequencies provides multiple degrees of freedom to achieve a desired combination of efficiency, light output quality and dimming range.

It will be appreciated that, generally, PWM frequency control according to embodiments of the inventive subject matter may implement a variety of different functional relationships. For example, as explained above, light intensity control inputs may take a variety of different forms, such as dimming control inputs, sensor inputs, color component control inputs and the like. For example, light intensity control inputs may include color control inputs used to control respective LED strings that produce respective color component outputs (e.g., blue-shift yellow and red) that are combined to produce a composite output having a particular color (e.g., white), color temperature and/or other characteristic. Apparatus and methods according to some embodiments may operate responsive to individual ones of such light intensity control inputs and/or to combinations of such inputs. Adjustment of PWM frequency responsive to such inputs may be based on weighted linear combinations. Adjustment of PWM frequency may also be nonlinear, e.g., different mappings of control inputs to PWM frequency may be used for different ranges of control inputs.

It will be appreciated that the implementations described above are provided for purposes of illustration, and that embodiments of the inventive subject matter may be implemented in variety of different ways. For example, although FIG. 4 illustrates a microcontroller-based implementation, other embodiments may use other digital circuitry and/or analog circuitry to provide similar functionality. For example, PWM frequencies may be generated using PWM signal generators fed by discrete variable oscillators or similar circuitry, rather than using a PWM capability included in a microcontroller. Similarly, a different control architecture than the one illustrated in FIG. 5 may be used.

As will be appreciated by one skilled in the art, embodiments of the inventive subject matter may be illustrated and described herein in any of a number of patentable classes or contexts including any new and useful process, machine, manufacture, or composition of matter, or any new and useful improvement thereof. Accordingly, some embodiments of the inventive subject matter may be implemented entirely hardware, entirely software (including firmware, resident software, micro-code, etc.) or combining software and hardware implementation that may all generally be referred to herein as a "circuit," "circuitry," "module," "component," and/or "system." Furthermore, some embodiments of the inventive subject matter may take the form of a computer program product comprising one or more computer readable media having computer readable program code embodied thereon. For example, operations of the microcontroller 422 of FIG. 4 may be performed using a computer program product including computer code embodied in a computer-readable medium, such as memory circuitry included in and/or coupled to the microcontroller 422. It will be appreciated that such computer code may also be stored as one or more computer files in a computer accessible location, such as a website. Generally, computer readable media may include, but is not limited to, electronic, magnetic, optical, electromagnetic, or semiconductor system, apparatus, or device, or any suitable combination of the foregoing.

Embodiments of the inventive subject matter are described herein with reference to block diagrams and other types of illustrations depicting methods, apparatus, and computer program products. It will be understood that various blocks of block diagrams, and combinations of blocks in block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the disclosure.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or otherwise structured to do so. As used herein, the term "and/or" or "/" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. When a third element "couples" first and second elements, additional intervening elements may be present between the third element and the respective first and second elements. It will be further understood that elements "coupled in series" or "serially connected" may be directly coupled or may be coupled via intervening elements.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The corresponding structures, materials, acts, and equivalents of any means or step plus function elements in the claims below are intended to include any disclosed structure, material, or act for performing the function in combination with other claimed elements as specifically claimed. The description of various embodiments of the inventive subject matter herein has been presented for purposes of illustration and description, but is not intended to be exhaustive or limited to the forms disclosed. Many modifications and variations will be apparent to those of ordinary skill in the art without departing from the scope and spirit of the disclosure.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. An apparatus comprising:

a current modulation circuit configured to modulate a current in at least one light-emitting device responsive to a pulse width modulated control signal; and a control circuit configured to vary a pulse width of the pulse width modulated control signal responsive to a first control input and to control a frequency of the pulse width modulated control signal responsive to a second control input.

2. The apparatus of claim 1, wherein the first control input comprises a current control input and wherein the second control input comprises a light intensity control input.

3. The apparatus of claim 2, wherein the control circuit is configured to increase the frequency responsive to a change in the light intensity control input corresponding to a decrease in light intensity and to decrease the frequency responsive to a change in the light intensity control input corresponding to an increase in light intensity.

4. The apparatus of claim 1, wherein the frequency comprises a first frequency and wherein the control circuit is further configured to concurrently modulate the pulse width modulated signal at a second frequency lower than the first frequency and to control the second frequency responsive to the second control input.

5. The apparatus of claim 4, wherein the second control input comprises a light intensity control input and wherein the control circuit is configured to increase the second frequency responsive to a change in the light intensity control input corresponding to a decrease in light intensity and to decrease the second frequency responsive to a change in the light intensity control input corresponding to an increase in light intensity.

6. The apparatus of claim 1, wherein the control circuit is configured to control the pulse width of the pulse width modulated control signal responsive to a measure of the current.

7. The apparatus of claim 6, wherein the control circuit is further configured to generate samples of the current at a rate that varies with the frequency and to generate the measure of the current from the generated samples.

8. The apparatus of claim 7, wherein the control circuit is configured to sample the current at the frequency.

9. The apparatus of claim 7, wherein the current modulation circuit comprises:

a current sense resistor; and a switch that couples and decouples the current sense resistor and the at least one light emitting device, wherein the control circuit is configured to sample the current by sampling a voltage across the resistor.

10. The apparatus of claim 1, wherein the second control input comprises a dimming input.

11. The apparatus of claim 1, wherein the at least one light-emitting device comprises at least one LED.

12. An apparatus comprising:

at least one light-emitting device; and a current control circuit comprising a current regulator configured to pulse width modulate a current in the at least one light-emitting device with a variable pulse width and at a pulse width modulation frequency that varies responsive to a control input other than an input to the current regulator.

13. The apparatus of claim 12, wherein the current control circuit is configured to vary the pulse width modulation frequency responsive to a control input for changing a light output characteristic.

14. The apparatus of claim 12, wherein the control input comprises a dimming input.

15. The apparatus of claim 12, wherein the current control circuit is configured to increase the pulse width modulation frequency responsive to a change in the control input corresponding to a decrease in light intensity and to decrease the pulse width modulation frequency responsive to a change in the control input corresponding to an increase in light intensity.

16. The apparatus of claim 12, wherein the current control circuit is configured to concurrently modulate the current at a first pulse width modulation frequency and at a second pulse width modulation frequency lower than the first pulse width modulation frequency and to control the first and second pulse width modulation frequencies responsive to the control input.

17. The apparatus of claim 12, wherein the current control circuit is configured to sample the current at a rate that varies with the pulse width modulation frequency.

18. The apparatus of claim 17, wherein the current control circuit is configured to sample the current at the pulse width modulation frequency.

19. A method comprising:

varying a pulse width of a pulse width modulation applied to a current in at least one light-emitting device responsive to a first control input; and controlling a frequency of the pulse width modulation responsive to second control input.

20. The method of claim 19, wherein the second control input comprises a light intensity control input.

21. The method of claim 20, wherein controlling a frequency of the pulse width modulation responsive to a second control input comprises increasing the frequency responsive to a change in the light intensity control input corresponding to a decrease in light intensity and decreasing the frequency responsive to a change in the light intensity control input corresponding to an increase in light intensity.

22. The method of claim 19, further comprising sampling the current at a rate that varies with the frequency and wherein controlling a pulse width of a pulse width modulation applied to a current in at least one light-emitting device responsive to first control input comprises controlling the pulse width responsive to the sampled current.

23. The method of claim 19, further comprising:

concurrently modulating the current at a first frequency and at a second frequency lower than the first frequency; and controlling the first and second frequencies responsive to the second control input.

* * * * *

UNITED STATES PATENT AND TRADEMARK OFFICE

CERTIFICATE OF CORRECTION

PATENT NO. : 9,585,218 B2
APPLICATION NO. : 14/465431
DATED : February 28, 2017
INVENTOR(S) : Pope et al.

It is certified that error appears in the above-identified patent and that said Letters Patent is hereby corrected as shown below:

In the Specification

Column 6, Line 10: Please correct "feedback signal" to read -- feedback signal $i_{fb}$ --

Signed and Sealed this
Third Day of October, 2017

Joseph Matal

*Performing the Functions and Duties of the Under Secretary of Commerce for Intellectual Property and Director of the United States Patent and Trademark Office*